United States Patent [19]

MacChesney et al.

[11] 4,302,230
[45] Nov. 24, 1981

[54] HIGH RATE OPTICAL FIBER FABRICATION PROCESS USING THERMOPHORETICALLY ENHANCED PARTICLE DEPOSITION

[75] Inventors: John B. MacChesney, Lebanon; Jay R. Simpson, Fanwood; Kenneth L. Walker, Florham Park, all of N.J.

[73] Assignee: Bell Telephone Laboratories, Incorporated, Murray Hill, N.J.

[21] Appl. No.: 143,845

[22] Filed: Apr. 25, 1980

[51] Int. Cl.³ .................. C03B 37/07; C03B 37/075
[52] U.S. Cl. .................. 65/3.12; 65/30.1; 427/163; 427/237
[58] Field of Search .......... 65/3 A, 30 R, 3.11, 65/3.12, 18.2, 30.1; 427/163, 237

[56] References Cited

U.S. PATENT DOCUMENTS

| | | | |
|---|---|---|---|
| 3,823,995 | 7/1974 | Carpenter | 65/3 A X |
| 3,957,474 | 5/1976 | Kobayashi | 65/3 A |
| 3,966,446 | 6/1976 | Miller | 65/3 A X |
| 4,062,665 | 12/1977 | Izawa et al. | 65/3 A |
| 4,135,901 | 1/1979 | Fujiwara et al. | 65/3 A X |
| 4,217,027 | 4/1980 | MacChesney et al. | 65/3 A X |
| 4,263,032 | 4/1981 | Sinclair et al. | 65/3 A |

FOREIGN PATENT DOCUMENTS 2317244 2/1977 France .................. 65/3 A
54-4131035 10/1979 Japan .................. 65/3 A
54-4151623 11/1979 Japan .................. 65/3 A

OTHER PUBLICATIONS

Walker et al., "Consolidation of Particulate Layers...", J. American Ceramic Society, vol. 63, No. 1-2, Jan. 1980, pp. 96-102.
Simpkins et al., "Thermophoresis ... In Modified Chemical Vapor Deposition", J. Appl. Phys., vol. 50, No. 9, Sep. 1979, pp. 5676-5681.
Walker et al., "Thermophoretic Deposition", Journal of Colloid and Interface Science, vol. 69, No. 1, Mar. 15, 1979, pp. 138-147.

*Primary Examiner*—Richard V. Fisher
*Attorney, Agent, or Firm*—Samuel H. Dworetsky

[57] ABSTRACT

This invention is a technique for fabricating optical fibers using thermophoretically enhanced particle deposition. In this process a cooling liquid such as water is poured over the substrate upon which deposition occurs in order to thermophoretically enhance the deposition. It has been found that despite the significant thermal shock that such water imparts to the tube, and despite previous difficulty with cracking because of thermal stresses which may develop, especially upon cooling, applicants have found that structural integrity may be maintained and enhanced deposition rates result.

12 Claims, 2 Drawing Figures

HIGH RATE OPTICAL FIBER FABRICATION PROCESS USING THERMOPHORETICALLY ENHANCED PARTICLE DEPOSITION

1. Field of the Invention

This invention involves the high rate fabrication of optical fibers using thermophoretically enhanced deposition of particles.

2. Description of the Prior Art

There are currently three major processes being used to form optical fibers for use in long distance optical transmission systems. The first is a process developed at Corning Glass Works and commonly referred to as the "soot" process. In this process, described in part in U.S. Pat. No. Re. 28,029 and U.S. Pat. No. 3,823,995, glass precursor reactants are flowed through a flame hydrolysis burner where they react to form particulate material referred to as "soot." The particulate material is directed to a cylindrical mandrel upon which it is deposited. The hydrolysis burner traverses the cylindrical mandrel numerous times to yield a relatively thick, multilayered, "soot" structure. The mandrel is then removed and the "soot" structure is consolidated into a clear glass tube. The tube is then heated to its drawing or working temperature, and drawn so as to collapse the tube and yield a solid optical fiber. The nature and concentration of glass precursor reactants fed to the flame hydrolysis burner may be varied from traverse to traverse to yield a graded index fiber.

A related process is described in part in U.S. Pat. Nos. 3,957,474, 3,966,446, 4,062,665, and 4,135,901. In this process, the "soot" material, formed in an appropriate burner, is directed to a rotating, relatively-flat, plate-like mandrel upon which it is deposited. The mandrel is identified as relatively flat only for ease of description. The process, however, may be practiced equally well with mandrels which are not flat and with deposition occurring on the non-flat surface. The axis of rotation of the mandrel is approximately perpendicular to the relatively flat surface of the mandrel. The particulate material may be deposited upon the mandrel from a direction *approximately* parallel to the axis of rotation, including, in some embodiments, deposition from directions that are not parallel to the axis of rotation. In this manner a relatively cylindrical "soot" structure is axially grown upon the rotating mandrel. Because of the axial growth configuration, the process is referred to as "Vapor Axial Deposition (VAD)." Appropriate temperature configurations, or multiple burners, may be used to yield an index of a fraction configuration which varies radially from the center of the axially grown structure to its periphery. The cylinderlike structure which is grown using this process may be consolidated to a clear glass either in a separate step or continuously as the structure is grown. The solid structure thus formed is then drawn into an optical fiber, once again either continuously or in a separate step.

A third process for forming optical fibers is described in U.S. patent application, Ser. No. 828,617, filed Aug. 29, 1977, issued as U.S. Pat. No. 4,217,027, on Aug. 12, 1980, a continuation of U.S. patent application Ser. No. 444,705 filed Feb. 22, 1974, now abandoned, and is commonly referred to as the "Modified Chemical Vapor Deposition Process (MCVD)." In this process, glass precursor vapors are flowed down the center of a starting tube rotating about its axis of symmetry. The tube is traversed by an external heat source thereby yielding a traversing hot zone. As the reactants pass the hot zone formed by the external heat source, they react to form particulate material which deposits downstream of the hot zone, relative to the reactant gas flow, and which is consolidated to a clear glass layer by subsequent passage of the traversing heat source. Consequently at any given time, the heat source is performing two functions. It is stimulating reaction of precursor vapors to form particulate material, while simultaneously fusing deposited particulate material into a unitary glass layer. Multiple traverses, with variation of the precursor gases from traverse to traverse, results in the deposition of multiple layers of varying index of refraction and hence in the fabrication of a radially graded optical fiber. Usually, the tube formed in this process is collapsed to a solid structure before drawing and then, in a separate step, is drawn into a fiber. (The particulate material used in this process will be referred to generally as glass precursor particulate to indicate that they are used in forming a glass structure).

Unlike the soot and vapor axial deposition processes, reaction in the modified chemical vapor deposition process occurs within the closed environment of a tube thus shielding the reactants from undesirable contaminants. Consequently, in the modified chemical vapor deposition process, glass precursor reactants are isolated from any contaminant gases associated with the heat source such as gases needed to sustain an external flame heat source. This is of significance since flame sustaining gases generally include hydrogen, resulting in the formation of OH radicals when mixed with glass precursor reactants which include oxygen. Consequently, in both the "soot" process and the vapor axial deposition process, where reaction to form particles generally occurs in the presence of flame sustaining gases, OH radicals form in the glass, and additional steps must be taken to remove the undesirable OH radicals which would yield increased loss in the optical fiber. In the modified chemical vapor deposition process, however, such formation of OH radicals is substantially avoided since glass precursor reactants are isolated from flame sustaining gases.

The modified chemical vapor deposition process, as usually practiced, also yields a more mechanically stable, *solid* glass structure, or preform, from which the fiber is drawn. This solid preform is more stable especially when compared with the tubular intermediate product formed in the "soot" process or in other prior art processes. This advantageous aspect of MCVD may be understood, for example, by considering that in the "soot" process when the mandrel is removed, a tubular structure remains. Even after consolidation, the process still yields a tubular glass structure, although perhaps of reduced dimensions, which is then drawn into a fiber and collapsed in a single step. When a graded index fiber is formed, the radial variation in index of a refraction, and consequently in coefficient of thermal expansion, yields significant stresses during the cooling that occurs between formation of the tube and drawing, oft-times resulting in cracking, especially if high NA fibers are to be formed. In the MCVD process, on the other hand, the tubular structure formed subsequent to completion of deposition is usually immediately collapsed into a solid structure prior to significant cooling. Consequently, a *solid* structure, which is more mechanically stable, is formed prior to cooling. The structure is more mechanically stable since the relatively unstable free surface on the interior tube wall is eliminated with collapse of the tubular structure to a solid—a collapse which is effected while the tube is still warm and relatively stress-free. High NA fibers may consequently be formed more expeditiously using the MCVD process.

Despite the rapid and overwhelming success of the modified chemical vapor deposition process, efforts continue to improve the process still further. These efforts are directed to areas of significance to widespread and economic commercial use, such as increase in deposition rate. Research efforts directed towards increasing deposition rates in the modified chemical vapor deposition process have centered, in part, about understanding the mechanisms responsible for deposition of the particulate material on the tube wall subsequent to its formation within the tube. It has recently been discovered that a primary mechanism responsible for directing the particulate material from the center of the tube where it is formed to the tube wall upon which it deposits is the particulate driving force associated with the thermal gradient which exists within the tube [See: U.S. application Ser. No. 934,816 filed Aug. 18, 1978 issued as U.S. Pat. No. 4,263,032 on Apr. 21, 1981; "Thermophoresis: The Mass Transfer Mechanism In Modified Chemical Vapor Deposition," P. G. Simpkins, S. Greenberg-Kosinski and J. B. Mac Chesney, J. Applied Physics, Vol. 50, pages 5676–5681 (September 1979); and "Thermophoretic Deposition of Small Particles In Laminar Tube Flow" K. L. Walker, G. M. Homsy and F. T. Geyling, Journal of Colloid And Inter. Science, Vol. 69, No. 1, pages 138–147 (March 1979)]. According to this explanation, particulate material, when located within a thermal gradient, is given from the higher temperature regions of the gradient to the lower temperature regions. This movement is attributed to the effect of the more energetic molecules in the higher temperature regions which collide with the particules suspended in the gas stream and drives them to the lower temperature regions.

This thermophoretic model also explains the observation that in the modified chemical vapor deposition process the particulate material generally deposits primarily downstream of the heat source rather than in the region of the heat source itself. The modified chemical vapor deposition process, as commonly practiced, generally involves a thermal gradient which, in the region of the heat source, drives particles from the hotter wall to the cooler interior of the tube. Downstream of the heat source, however, the temperature gradient reverses direction and drives particles from the hotter central regions of the tube to the cooler tube wall. It is only in this downstream region, where the thermal gradient points from the interior of the tube to the tube wall, that the particles will be driven from the center of the tube where they are formed to the tube wall upon which they deposit. This research effort has yielded the suggestion that enhanced thermal gradients may be utilized to increase the particulate deposition rate in modified chemical vapor deposition. Various suggestions and specific configurations have been forwarded to yield such enhanced thermophoresis. These suggestions involve alteration of the thermal configuration of the heat source, utilization of additional heat zones within the tube, and cooling of the tube wall by appropriate gaseous flow.

SUMMARY OF THE INVENTION

This invention is a technique for fabricating optical fibers using thermophoretically enhanced particle deposition. In this process a cooling liquid such as water is poured over the substrate upon which deposition occurs in order to thermophoretically enhance the deposition. It has been found that despite the significant thermal shock that such water imparts to the tube, and despite previous difficulty with cracking because of thermal stresses which may develop, especially upon cooling, applicants have found that structural integrity may be maintained and enhanced deposition rates result.

DETAILED DESCRIPTION

1. Enhanced Thermophoresis

The invention is a technique for more efficiently depositing particulate material on appropriate substrates during fiber fabrication processing. Although the inventive process may be practiced with a wide variety of fiber fabrication techniques, this description will be in terms of the exemplary modified chemical vapor deposition process. The invention is based on an appreciation of the role of thermophoresis as the driving force which introduces a component of velocity that directs the particles from their relatively hot point of formation to the relatively cool regions of the substrate upon which they deposit. Enhancement of this effect, which results in movement of the particles from hotter to cooler regions, will yield increased deposition rates. In this invention, cooling with an appropriate liquid, such as water, is used to lower the temperature of the substrate upon which the deposition occurs, thereby increasing the thermal gradient to which the particles are exposed, and improving the deposition efficiency rate.

Figure 1:
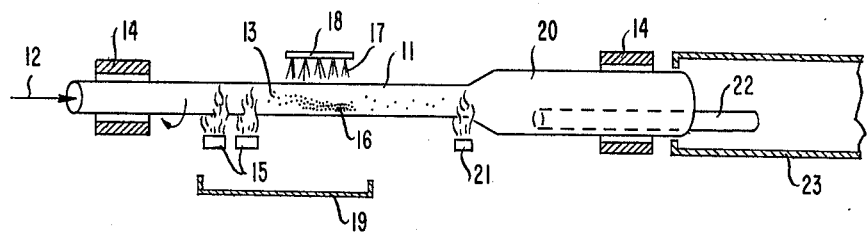
FIG. 1 is a schematic representation of an apparatus used in the practice of this invention.

FIG. 1 is a schematic representation of an exemplary embodiment of this invention presented in terms of the modified chemical vapor deposition process. In this figure, (11) is the rotating support tube down the center of which glass precursor reactant gases (12) are flowed to yield particulate material (13) which deposits on the interior of the tube. In the drawing, (14) are appropriate lathe chucks which support the substrate tube. The reactant gases react to form particulate material when they pass through the hot zone formed by the heat source (15), in this embodiment appropriate torches. Alternative heat sources include resistor ovens, rf susceptor ovens, and rf coils which yield an rf plasma at the center of the tube. The particulate material deposits downstream of the heat source in the region (16) since in this region the thermal gradient favors motion of the particles from the center of the tube to the tube wall, i.e., in this region, the tube has cooled whereas the gaseous stream in which particulate material is suspended remains hot. Hence, the thermal gradient which, in this region, points from the hotter central region of the tube to the tube wall results in thermophoretic deposition of the particulate material on the interior tube wall.

In the embodiment of FIG. 1, the thermal gradient favoring deposition is enhanced by pouring a cooling liquid (17), such as water, from an appropriate source (18), on the tube to further and more rapidly cool the tube. In the embodiment of FIG. 1, the source of cooling water (18), and the trough (19) which catches the water are connected to the traverse mechanism which guides the torches. The water is preferably de-ionized in order to avoid introduction of contaminants onto the exterior tube wall. Such contaminants may contribute to a lowering of the strength of the resultant fiber. However, appropriate material may be added to the water to react at the tube surface or be incorporated with the tube surface thereby altering the material properties of the glass at the tube surface. It has been appropriately found that altering the properties of the exterior tube wall may introduce compressive stresses into the exterior wall of the resultant fiber thereby increasing its strength.

2. Considerations Of Thermal Stress

While the general thermophoretic mechanism had been previously appreciated, apparently none of the suggested enhancement techniques included application of cooling liquid. It was felt by workers in the field that application of such cooling liquid in the region of the heat source would result in cracking due to thermal stress. Cracking of both glass tubes and "soot" structures had been a prevalent concern since the inception of fiber fabrication processing. This concern had been based on the widespread experience of significant cracking due to thermal stresses. These stresses are caused by the variation in the thermal expansion coefficient of the structures due to associated variation in the dopant concentration engineered into the structure from which the fiber is drawn. Previous fiber fabrication processes involved the formation of an intermediate tubular structure which when cooled, between the time of its formation and the time of drawing, often cracked due to thermal stresses. Consequently, for particular dopants, there were inherent limitations in the degree of radial index of refraction gradient which could be tolerated, and hence in the numerical aperture (N. A.) of the resulting fiber. For example, in many processes numerical apertures of 0.23 could not be achieved.

The modified chemical vapor deposition process was able to yield increased numerical apertures since in most embodiments of this process the tubular structure formed in the course of optical fiber fabrication was immediately collapsed to a solid structure prior to cooling. Consequently, the free surface associated with the interior tube wall, which would encourage and increase thermal stressing, was eliminated by collapse of the tube to a solid structure immediately subsequent to formation, and prior to cooling. Nevertheless, the concern with thermal stresses and associated cracking continues to find expression, even in the MCVD process, in a general reluctance to expose the glass structures to increased thermal stresses.

Applicants have found that despite this experience, the tube in the modified chemical vapor deposition process may be cooled immediately downstream of the traversing heat source by the application of a cooling liquid such as water without cracking of the tube or of the glass deposit. Although there are additional thermal stresses associated with this cooling, and although consequently, there may be some material systems for which numerical apertures cannot be obtained with values as high as those obtained without water cooling, nevertheless, relatively high numerical apertures may be obtained along with the significant increases in deposition rate which applicants have shown is associated with use of cooling water. For fabrication of higher N. A. fibers, the practitioner may consider lower cooling liquid flow rates, such as through the use of a spray, thereby still obtaining some improvement in deposition parameters while fabricating high N. A. fibers.

Although the cooling liquid has generally been referred to as water, it is clear that any appropriate cooling liquid may be used in the practice of this invention. The purpose of the cooling liquid is to cool the tube wall to a temperature lower than the temperature, $T_{min}$, which it reaches without the application of the cooling liquid. It is consequently clear that the temperature of the liquid should be lower than the $T_{min}$, the temperature which the tube wall would reach downstream of the heat source without the application of a cooling liquid. To effect significant cooling, however, it is preferably to have the temperature of the cooling liquid as low as possible and to use a liquid with specific heat and latent heat vaporization as high as possible. Nevertheless, in the selection of a cooling liquid, consideration must be given to the fact that if the temperature of the liquid is too cool, the tube may not be able to sustain the associated thermal stressing. In addition, use of a cooling liquid whose temperature is too cool, may result in condensation of reactants or reactant produces which may adversely affect the optical properties of the tube unless these deleterious constituents are otherwise processed.

When the water is first applied to the support tube, significant amounts of vapor are produced because of the high temperature of the tube relative to the boiling point of the cooling liquid, even downstream of the heat source. However, water flows in excess of a half a liter a minute result in relatively rapid cooling of the tube and eventual formation of a sheet of water which flows around the tube, cooling it to temperatures of less than 100 degrees C. There was some initial concern that the vapor produced when the water first contacts the hot tube would hinder the efficiency with which the tube is cooled by reducing contact between the liquid and the tube, thereby reducing the required thermal transfer. Applicants have found, however, that sufficient water flow may be applied so that any vapor which is produced will not prevent effective cooling of the tube by the water. In most instances, after some initial steam formation immediately after the turn-on of the water, no significant steam is observed. The water, rather, forms a smooth sheet around the tube. However, consideration of other cooling liquids must take into account the effect of formation of vapor and its effect on the efficient cooling of the tube.

3. Reduction In Deposit Taper

In addition to the increase in deposition rate and efficiency which is observed, other benefits accrue as a result of the enhanced thermophoretic cooling practiced in this invention. For example, some taper in the deposit layer thickness is generally observed in current fiber fabrication processes involving particle deposition. This taper is associated with the relatively extended deposition region downstream of the heat source. Because of the extent of the deposition region, the amount of deposition at the beginning of the tube traverse is generally less than the amount of deposition elsewhere. However, with the practice of this invention, the deposition region may be significantly narrowed and may extend substantially only over the region of water cooling. Because of the narrowed region of deposition, it is found that the taper in deposited layer thickness, is significantly shortened and extends, for example, only over a region of approximately 20 cm at the beginning of the tube if the water cooling region is 20 cm long. Of course, for low cooling-liquid flow rates, an extended cooling region may result in still further enhanced thermophoretic deposition and hence will increase the deposition efficiency. However, such an extended region will also result in a broader taper, and so in such a situation, the practitioner must weigh the benefit of extended regions of water cooling for their increased efficiency, as compared to the benefit of narrower regions of water cooling with lower deposition efficiency but reduced taper.

Figure 2:
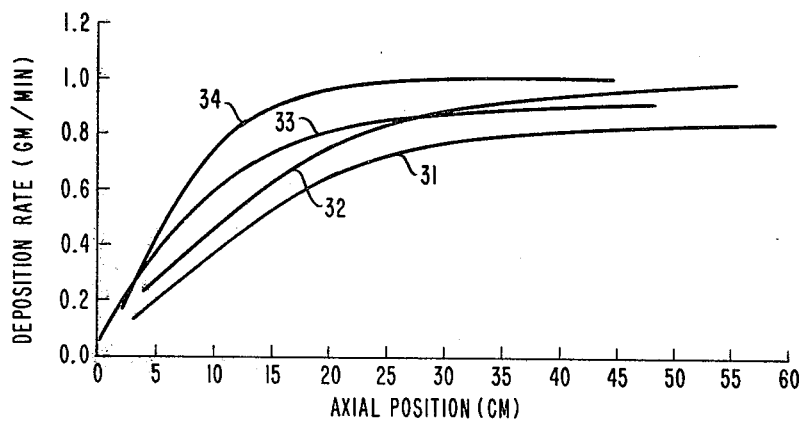
FIG. 2 is a representation of deposition rates which may be obtained with the practice of this invention.

The deposition rate and efficiency are very sensitive to the equilibrium gas temperature $T_E$, i.e., the temperature of the tube wall at the end of the deposition region. We have found that without enhanced cooling, the equilibrium temperature $T_E$ at the upstream torch reversal point may be as much as 100 degrees C. higher than $T_E$ at the downstream torch reversal point. This would result in an end-to-end deposition rate difference of 10% and corresponding end-to-end taper. By increasing the thermal diffusivity of the gas stream, such as by modifying its composition by the introduction of helium, or by lengthening the cooling zone, we insure that the equilibrium temperature $T_E$ does not vary along the support tube during deposition, hence eliminating the end-to-end taper, as shown in FIG. 2. This figure shows deposition rates for various axial positions depending upon operating conditions. In this figure, (31) presents deposition without the use of cooling water and without the introduction of helium into the gas stream, (32) represents deposition conditions without the use of water cooling, but with the use of helium in the gas stream, (33) represents deposition conditions with the use of water cooling, but without the use of helium in the gas stream and (34) represents deposition conditions with the use of both water cooling and helium in the gas stream. It is apparent that the use of water cooling to enhance the thermophoretic effect, and the use of helium in the gas stream to ensure more rapid thermal equilibration of the gas, results in reduced taper and more uniform deposition rate along the tube.

4. Uniformity In Deposited Layer Thickness

As discussed above, in addition to the improved taper, practice of this invention results in more uniform temperatures over the deposition region and hence in more uniform deposited layers. Applicants, for example, find that in an 80 cm tube the last 55 cm of the tube can be fabricated with a variation in deposited layer thickness of less than 1 percent when this invention is practiced. This should be compared to a deposited thickness variation of up to 5 percent using previous MCVD techniques. Such variations are extremely critical, especially in single mode fiber fabrication, and reduction in these variations, as obtained in this invention, enhance the operating efficiency of optical fiber so produced.

5. Cooling During Retraverse

As shown in FIG. 1, the heat source in the modified chemical vapor deposition process, traverses the tube during processing. Particulate material deposits downstream of the heat source and is subsequently consolidated by the traversing heat source into a uniform and unitary glass layer. When the heat source reaches the right-hand side of the support tube, the temperature of the heat source is usually lowered, and a rapid traverse to the left side of the tube is effected. Applicants find that if on retraverse the cooling water is not turned off, some deposition continues, associated with particle formation due to residual temperatures within the tube and the presence of reactant gases. Since the retraverse is rapid, applicants find that such deposition is highly asymmetrical, and hence they find that it is advantageous to turn off the water during the retraverse to minimize and essentially avoid this asymmetrical deposition during retraverse. Alternatively, at least some of the reactant gas flow may be turned off thereby preventing any particle formation.

6. Particle Agglomeration

Applicants find that with the high reactant flows which may be used with this mode of thermophoretic enhancement, greater quantities of particulate may be formed so as to yield increased deposition rates. Applicants consequently find that they may effectively flow over 4 or 5 grams of chloride reactants through the tube per minute to obtain increased particle formation and deposition when the thermophoretically enhanced technique described in this application is used. This flow rate should be compared with typical flow rates of 1 gram per minute in the modified chemical vapor deposition process, and maximum MCVD flow rates of approximately 2–3 grams per minute. Material deposition rates in the inventive process may be higher than 0.8 or even 1 gram per minute, as compared to deposition rates of 0.2 grams per minute for standard MCVD processing, and previously reported rates of up to 0.4 grams per minute obtained in MCVD when parameters are optimized.

Applicants find, however, that with the high flow rates which may be utilized in this invention, there is a high concentration of particulates formed, and a consequent tendency for these particulates to agglomerate before deposition, and to deposit as a large agglomerates, with resulting imperfections in the deposited layer.

To avoid this agglomeration and deposit, two steps may be taken. First, the downstream region of the tube may be heated. It is found that with this heating the agglomerated particles tend not to adhere to the tube wall but merely to traverse the tube wall and exit. Alternatively, applicants have lowered the concentration of reactants by replacing some of the oxygen flow with helium. Helium has previously been used in the MCVD process because of a belief that helium more rapidly diffuses out of the deposited layer after deposition, thereby avoiding formation of bubbles. However, applicants find that the effect of the helium is to increase the thermophoretic force because of the increased diffusivity of the helium and the consequently more rapid thermal equilibration of the gas.

7. Formation Of Undesirable Products

A. Broadened Heat Source

With the increased flow rates, applicants find that there is a tendency for incomplete reaction of the reactants. For example, if the gas stream is heated only to the vicinity of 900 degrees rather than to the vicinity of 1200 degrees, oxychlorides form and deposit downstream, yielding imperfections in the deposited layer. In order to avoid incomplete heating and the consequent formation of such undesirable products, applicants broaden the heat zone, such as through the use of multiple burners (15) so as to yield more efficient heating of the rapidly flowing gas stream. Applicants find that it is advantageous to tailor the heat source so that the temperature of the heat zone rises relatively gradually from the downstream region of the heat zone to the upstream region of the heat zone, and then falls at a rate more rapid than its rise. Sintering of the deposited layer is more efficiently effected with this type of a ramped heat source since the consolidation mechanism, which has been found to be one of viscous flow (See, K. L. Walker, et al., *Journal American Ceramic Society*, January 1980) results in less formation of bubbles when gradual heating is used. This reduced bubble formation is believed due to the more favorable ratio between vapor pressure within a closed pore and the pressure difference across the gas solid interface due to surface tension when the ramped hot zone described above is used. The broadened hot zone is especially effective when thicker walled, larger diameter tubes, with greater thermal inertia are used. Under these circumstances, the broader hot zone permits more effective heating of the gas stream. While the hot zone may be broadened physically, more rapid traversal of the heat source may also effectively broaden the hot zone.

B. Control Of Water Cooling

Despite the broadened heat source, applicants find that formation of oxychlorides is still a factor especially at the start of each new traverse of the heat source. This may be understood by considering that upon retraverse of the heat source, and its repositioning at the start of the tube when the temperature is once again raised so as to yield reaction, there is a finite period during which the flowing stream of gas is being heated to the desired reaction temperature for particle formation. Before the gas stream is heated to full temperature oxychlorides may be formed, and efficiently deposited downstream under the influence of the water cooling. Consequently, applicants, upon each retraverse, wait for a period of time long enough to allow the gas stream to heat sufficiently for particulate formation to commence, i.e., 5 to 15 seconds or greater, before starting the new traverse and commencing cooling. The effect of this is to permit any oxychlorides which are formed to flow through the tube without deposition, since when the water cooling is off the tube wall downstream of the heat source is sufficiently warm to prevent condensation of undesirable oxychlorides. If, however, the water cooling were to be turned on, the tube wall would be cooled immediately to a temperature less than 100 degrees C., resulting in the condensation of the oxychlorides.

8. Exhaust Of Undeposited Particles

In order to accommodate the significant amounts of particulate material which are not deposited and hence, which must be effectively exhausted from the MCVD tube, a larger diameter tube (20), commonly referred to as a "dust catcher," is connected to the MCVD tube during particle formation. The large diameter of this tube allows for more effective exhaust of undeposited particles. A flame (21) is positioned at the joint between the MCVD tube and the dust catcher to prevent cracking due to thermal stressing and to simultaneously prevent build-up of particulate material at this juncture. Such build-up would ultimately block the tube hindering both particle and gas flow and may result in eventual blow-out of the MCVD tube. The flame (21) prevents deposition of particles because of the thermal gradient which it establishes which renders the tube at that point hotter than the flowing gases. Some particulate material does deposit in the dust catcher (20), and rod (22) prevents excessive build-up of this material. This rod is allowed to travel freely within the tube, dislodging particulate material which deposits there. Application of a slight suction, at a rate greater than the gas flow rate through tube (11) by means of tube (23), further aids in effective removal of exhaust particulates.

EXAMPLE

Single mode fiber preforms were fabricated using a standard MCVD apparatus consisting of a glass working lathe and an oxygen carrier bubbler delivery system metered by electronic flow controllers. The $SiCl_4$ was delivered at 5 grams per minute using a bubbler at 44 degrees C. with oxygen as the carrier gas. ($POCl_3$ and $GeCl_4$ were similarly delivered.) Reaction and particle deposition occurred inside a silica support tube heated by 2 surface mix water cooled torches creating a hot zone 10 cm wide. An 18 cm section of the silica tube immediately downstream of the hot zone was cooled using 2 liters per minute of deionized water. Water cooling was not used during firecarriage retrace. Undeposited waste powder is collected in a 6 cm silica tube connected to the downstream end of the support tube (FIG. 1). The waste particles are then swept away by a suction tube connected to an exhaust ventilation system. A small torch continually heating the support tube-dust collector connection prevented local waste particle buildup.

Preforms were fabricated using the conditions outlined in Table I and were subsequently drawn into fiber using an R. F. induction furnace, coated with silicone in line, and wound under low tension on 30 cm diameter drums.

TABLE I

Deposit Conditions

Substrate Tube 25 × 27 mm Hereaus T08
Torch Traverse 18 cm/min.

Cladding
17 Passes                    Deposit Temp. - 1650 Degrees C.
$SiCl_4$ - 5.0 g/min.
$POCl_3$ - 0.065 g/min.
$O_2$ - 2170 cc/min.
He - 2500 cc/min.

Core
1 Pass - Deposit Temp. - 1680 Degrees C.
$SiCl_4$ - 1.3 g/min.
$GeCl_4$ - 0.31 g/min.
$POCl_3$ - 0.02 g/min.
$O_2$ - 2300 cc/min.

The deposition rate along the preform is shown in FIG. 2 for 4 preforms fabricated under different conditions. Two characteristics appear: an entry length taper (0 to 20 cm) followed, in some cases, by an end to end deposit taper. The X-axis zero corresponds to the upstream turn-around point. All preforms shown were fabricated with a total gas flow of 5.2 liters per minute in a 25×27 mm support tube. Two factors were studied: the replacement of 2.5 liters per minute of oxygen with helium and the use of downstream wafer cooling. The use of helium with ambient cooling increases the deposition efficiency as predicted, diminishing the deposition length. Downstream water cooling without helium also increases the deposition efficiency with a more pronounced decrease in entry taper. The combined effects of helium and water cooling, represented by the top curve, result in an entry taper of 20 cm followed by a constant average core/cladding deposition rate of 1 gram per minute and corresponding efficiency of 56 percent. The combination is particularly effective in that the deposition length determined by $0.12\ Q/\alpha$ is nearly equal to the deposition length determined by the water cooling (20 cm). Without the helium, the 0.12

Q/α deposit length is 33 cm, resulting in the lower deposition efficiency shown. Preforms deposited with identical flows inside support tubes as small as 16 mm I.D. show only slight changes compared with 25 mm I.D. The observation that tube I.D. has little effect on entry taper and deposition rate, surprising at first sight, is in agreement with theoretical prediction.

The spectral loss character of the high deposition rate fiber using conditions shown in Table I were studied. A minimum loss of 1.0 dB/Km appears at a wavelength of 1.2 microns. The fiber core diameter of 9.2 microns and an appropriate core cladding refractive index difference were chosen to create single mode operation at wavelengths above 1.1 microns. A cladding thickness to core ratio of 6:1 provides sufficient cladding. We observe no loss limitation due to the high rate deposited cladding which supports nearly 20 percent of the optical power guided in the single mode.

What is claimed is:

1. A method of fabricating optical fibers comprising:
   a. forming glass precursor particulate material;
   b. depositing the glass precursor particulate material on an appropriate substrate while heating the substrate to yield an optical fiber preform; and
   c. drawing the optical fiber perform into an optical fiber;
   the invention characterized in that
   the particulate material is thermophoretically directed from regions of higher temperature to regions of lower temperature utilizing liquid cooling means to cool portions of the heated substrate.

2. The method of claim 1 wherein the substrate is a tube.

3. The method of claim 2 wherein the tube is a glass tube.

4. The method of claim 3 wherein the glass precursor particulate is deposited on the interior wall of the glass tube.

5. The method of claim 4 further comprising
   introducing a moving stream of a vapor mixture including at least one compound glass-forming precursor together with an oxidizing medium into the tube while heating the tube so as to react the said mixture and produce a glassy deposit on the inner surface of the tube,
   heating the tube and contents by a moving hot zone produced by a correspondingly moving heat source external to the tube, and
   maintaining the composition of the vapor mixture, and rate of introduction of the vapor mixture at values such that at least a part of the reaction takes place within the gaseous mixture at a position spaced from the inner walls of the said tube, thereby producing a suspension of oxidic reaction product particulate material, whereby the particulate material while traveling downstream comes to rest on the inner surface of the tube within a region which extends from a position within the said hot zone, the moving zone serving the dual functions of: nucleation site for homogeneous reaction to produce particulate matter; and consolidation site for previously produced particulate matter.

6. The method of claim 5 wherein the cooling liquid is water.

7. The method of claim 6 wherein the water is poured on the outside of the tube downstream of the heat source.

8. The method of claim 7 wherein the water is poured on the tube at a rate greater than one-half a liter per minute.

9. The method of claim 8 wherein water is deionized.

10. The method of claim 8 wherein additional material is added to the water to alter the material properties of the glass at the tube surface.

11. The method of claim 8 wherein the water is turned off during retraverse of the tube by the heat source.

12. The method of claim 11 wherein the temperature of the heat source is lowered during retraverse and the heat source is held stationary prior to initiation of the new traverse for a period of at least five seconds prior to re-establishing water flow.

* * * * *